J. W. KENSETT.

METALLIC LATHING.

No. 7,651. Reissued May 1, 1877.

Witnesses;
M. C. Church
F. McKenny

Inventor
James W. Kensett.
By Hill Ellsworth
His Attys.

BEST AVAILABLE COPY

UNITED STATES PATENT OFFICE.

JAMES W. KENSETT, OF TROY, NEW YORK.

IMPROVEMENT IN METALLIC LATHING.

Specification forming part of Letters Patent No. 181,851, dated September 5, 1876; reissue No. 7,651, dated May 1, 1877; application filed March 7, 1877.

*To all whom it may concern:*

Figure 1:
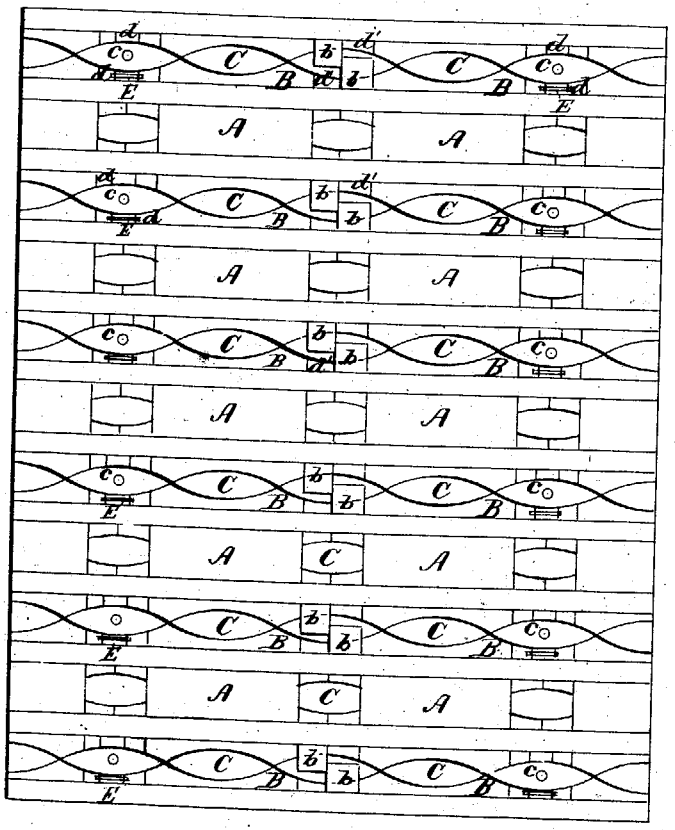
Figure 2:
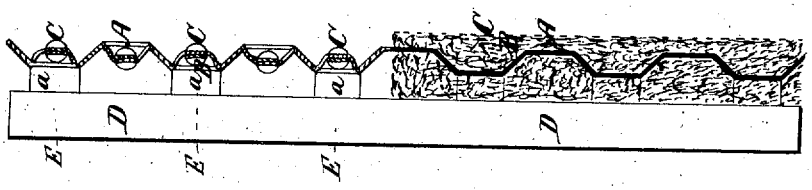
Figure 3:
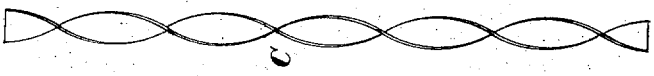

Be it known that I, JAMES W. KENSETT, of Troy, in the county of Rensselaer and State of New York, have invented certain new and useful Improvements in Lathing, of which the following is a specification:

In the accompanying drawings, Figure 1 represents a face view of a sheet of continuous lathing embracing my invention. Fig. 2 is a vertical section thereof, and Fig. 3 is a detail view of a twisted or spiral lath.

Similar letters of reference in the accompanying drawings denote the same parts.

My invention relates more particularly to means for holding the plastic covering or cement to walls, ceilings, &c., as I will now proceed to describe.

In the accompanying drawings, A A are the corrugations of a carrier, preferably made of metal, to receive the plaster or cement. In the depressions B B, between the corrugations A, I secure, by means to be presently described, a twisted or spiral lath, C, drawn or twisted from a narrow strip of sheet-tin or other suitable metal. This spiral lath I propose to use, as on some occasions it may be desirable, independently of its carrier—that is to say, as other lathing is used in building, to wit., upon studding and upon plain surfaces. It may also be employed upon surfaces made uneven or irregular to receive the plaster by means other than the corrugated metallic carrier.

When used, as shown, with its carrier of sheet metal or tin, it is preferably placed in the depression so as to be flush with the elevation.

It forms a most desirable and secure clamp or hold for the plaster, and is able to hold it intact, even when subjected to the most severe concussions. Upon one side of the corrugated carrier I form cleats *a a* at intervals corresponding to the studding D, which serve to hold it from the wooden surface and isolate it. I fasten my spiral laths C in the depressions B by means of struck-up clamps or chairs *b b* at intervals sufficient to hold the laths C rigidly and securely.

These spiral laths C are secured in the depressions B upon both sides of the carrier.

At the junctions of the carrier with the studding D these spiral laths present their flat or nearly flat vanes to the carrier, and are there secured at *c c* by nails. Openings *d d* also occur at these intervals, formed by the striking out of the cleats. Openings *d' d'* also occur at the clamps *b b*, which serve to permit both the inner and outer coats of plaster, which cover the diaphragm or carrier, to be interlocked.

Staples E or nails *c'* may be used to secure the carrier or plaster-holder to the wooden surface.

When the spiral laths C are to be used independently of the carrier, as shown in Fig. 3, I may, or not, reverse each alternate lath, and fasten them by nails.

I claim as my invention—

1. A twisted or spiral lath.
2. A twisted or spiral lath of tin or sheet metal.
3. The combination of a twisted or spiral lath with a surface to receive plaster.
4. The combination of a corrugated surface with one or more laths arranged longitudinally in the corrugations.
5. The combination of a twisted or spiral metallic lath, C, with the depressions B and clamp or chair fastenings *b b*, as and for the purpose described.
6. The combination of a twisted or spiral metallic lath, C, with a corrugated metallic holder for the plaster, substantially as described.

JAMES W. KENSETT.

Witnesses:
F. MCKENNEY,
MELVILLE CHURCH.